(12) United States Patent
Sase (10) Patent No.: US 8,208,202 B2
(45) Date of Patent: Jun. 26, 2012

(54) FOCUS DETECTION APPARATUS, MICROSCOPE

(75) Inventor: Ichiro Sase, Yokohama (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 12/500,202

(22) Filed: Jul. 9, 2009

(65) Prior Publication Data

US 2009/0273830 A1 Nov. 5, 2009

Related U.S. Application Data

(63) Continuation of application No. PCT/JP2008/050463, filed on Jan. 9, 2008.

(30) Foreign Application Priority Data

Jan. 19, 2007 (JP) ................................. 2007-010541

(51) Int. Cl.
*G02B 21/00* (2006.01)

(52) U.S. Cl. ...... 359/383; 359/368; 359/392; 250/201.4

(58) Field of Classification Search ........... 359/368–390
See application file for complete search history.

(56) References Cited

U.S. PATENT DOCUMENTS

| | | | | |
|---|---|---|---|---|
| 4,958,920 A * | 9/1990 | Jorgens et al. | ................. | 359/392 |
| 5,537,168 A * | 7/1996 | Kitagishi et al. | ............... | 353/101 |
| 5,966,204 A * | 10/1999 | Abe | ................ | 356/51 |
| 6,400,501 B2 * | 6/2002 | Tsuchiya et al. | ............... | 359/380 |
| 7,071,451 B2 * | 7/2006 | Ishikawa et al. | ........... | 250/201.4 |
| 7,109,459 B2 * | 9/2006 | Kam et al. | ................ | 250/201.4 |
| 7,202,953 B1 | 4/2007 | Mueller et al. | | |
| 7,486,329 B2 * | 2/2009 | Endo | ............................. | 348/345 |
| 7,663,078 B2 | 2/2010 | Virag et al. | | |
| 7,706,597 B2 | 4/2010 | Yoneyama et al. | | |
| 2002/0109923 A1 | 8/2002 | Matsui et al. | | |
| 2004/0022684 A1 | 2/2004 | Heinze et al. | | |
| 2004/0113043 A1 | 6/2004 | Ishikawa et al. | | |
| 2005/0175233 A1 | 8/2005 | Yoneyama et al. | | |

(Continued)

FOREIGN PATENT DOCUMENTS

CN 2550755 Y 5/2003

(Continued)

OTHER PUBLICATIONS

European Search Report issued Dec. 21, 2011 in Application No. 08703323.

*Primary Examiner* — Thong Nguyen
(74) *Attorney, Agent, or Firm* — Miles & Stockbridge P.C.

(57) ABSTRACT

A focus detection apparatus is provided with a light source 16 that emanates light with a given wavelength range; a reflection member 15 that reflects light emanated from the light source 16 to lead to an object 6a, reflects light from the light source 16 reflected from the object 6a, and transmits light from the object 6a with at least two different wavelength ranges except the light reflected from the object 6a; a photodetector 21 detecting the light from the light source 16 reflected from the object 6a; and a controller 22 detecting a focus shift between the objective lens 8 and the object 6a in the microscope 2 based on a signal detected by the photodetector 21, thereby providing a focus detection apparatus capable of limiting wavelength range of light for focus detection thereby able to use wider wavelength range for the microscope observation, and a microscope equipped therewith.

9 Claims, 7 Drawing Sheets

U.S. PATENT DOCUMENTS

| | | | |
|---|---|---|---|
| 2006/0157637 A1* | 7/2006 | Karasawa et al. | 250/201.7 |
| 2007/0041091 A1* | 2/2007 | Takeuchi | 359/386 |
| 2008/0099661 A1 | 5/2008 | Virag et al. | |

FOREIGN PATENT DOCUMENTS

| | | | |
|---|---|---|---|
| JP | 2002-303800 A | | 10/2002 |
| JP | 2003-270524 A | | 9/2003 |
| JP | 2004-070276 A | | 3/2004 |
| JP | 2005-62515 | * | 3/2005 |
| JP | 2006-309088 A | | 9/2006 |
| WO | WO 00/37984 A2 | | 6/2000 |
| WO | WO 2006/024967 A1 | | 3/2006 |

* cited by examiner

FOCUS DETECTION APPARATUS, MICROSCOPE

CROSS-REFERENCE TO RELATED APPLICATION

This application is a continuation of International Application No. PCT/JP2008/050463 filed Jan. 9, 2008.

TECHNICAL FIELD

The present invention relates to a focus detection apparatus and a microscope.

BACKGROUND ART

There have been proposed focus detection apparatuses for a biological microscope such as a technique that keeps focusing by detecting a glass interface in the vicinity of a sample using reflection of infrared light (for example, see Japanese Patent Application Laid-Open No. 2004-070276) is extremely effective upon performing an observation together with a dosage or a long time observation, or a continuous observation of a plurality of positions of a sample.

However, in a recent biological microscope, wavelength of a fluorescent dye used upon fluorescence observation has been getting longer, and such an observation using optical tweezers or two-photon excitation has been adopted. Accordingly, in a biological microscope, the wavelength of observation light is not limited to visible light, so that light having a wavelength range of near-infrared cannot be exclusively used for focus detection and keeping thereof.

SUMMARY OF THE INVENTION

The present invention is made in view of the aforementioned problems, and has an object to provide a focus detection apparatus that limits a wavelength range of light used for the focus detection and uses broader wavelength range except the wavelength of focus detection for microscope observation and other purposes than the focus detection, and a microscope equipped therewith.

In order to solve the above-described problems, according to a first aspect of the present invention, there is provided a focus detection apparatus comprising: a light source that emanates light with a given wavelength range; and an optical member that reflects focus detection light with a given wavelength range in order to detect focus shift between an objective lens and an object to be observed in a microscope, and transmits non-focus detection light with at least two wavelength ranges except the given wavelength range.

In the first aspect of the present invention, it is preferable that the wavelength range of the light that is emanated from the light source and reflected by the optical member is located between two wavelength ranges of light that comes from the object to be observed and transmits the optical member.

In the first aspect of the present invention, it is preferable that the optical member is a partial mirror that reflects marginal light flux of the light with the given wavelength range to lead to the object to be observed, and transmits the rest of the light flux.

In the first aspect of the present invention, it is preferable that the light source selectively emanates light with a plurality of different wavelength ranges, and the optical member is a dichroic mirror unit equipped with a plurality of dichroic mirrors that are corresponding to the light with the plurality of different wavelength ranges emanated from the light source, and removably movable into an optical path.

In the first aspect of the present invention, it is preferable that the light source selectively emanates light with a plurality of different wavelength ranges.

In the first aspect of the present invention, the focus detection apparatus preferably further comprising the light source that emanates light with a given wavelength range for illuminating the object to be observed for focus detection.

In the first aspect of the present invention, the focus detection apparatus preferably further comprises a photodetector that detects reflected light of the light source reflected by the object to be observed.

In the first aspect of the present invention, the focus detection apparatus preferably further comprises a controller that detects focus shift between the objective lens and the object to be observed in the microscope on the basis of a signal from the photodetector.

In the first aspect of the present invention, the focus detection apparatus preferably further comprises a second light source that emanates the non-focus detection light.

In the first aspect of the present invention, the focus detection apparatus preferably further comprises a second optical member that reflects light emanated from the second light source to the object to be observed and transmits light from the object to be observed.

In the first aspect of the present invention, it is preferable that the first light source emanates light with an infrared wavelength range, and the second light source emanates light with a longer wavelength range than the infrared wavelength range.

According to a second aspect of the present invention, there is provided a microscope equipped with the focus detection apparatus according to the first aspect.

In the second aspect of the present invention, it is preferable that the microscope includes an objective lens and a camera attaching portion, the optical member and the second optical member are disposed on the optical path between the objective lens and the camera attaching portion, the optical member is disposed to the objective lens side, and the second optical member is disposed to the camera attaching portion side.

In the second aspect of the present invention, it is preferable that the second light source is a light source of an optical tweezers.

In the second aspect of the present invention, it is preferable that the second light source is a light source of a two-photon excitation.

In the second aspect of the present invention, it is preferable that the first light source emanates light with an infrared wavelength range, and the second light source emanates light with a longer wavelength range than the infrared wavelength range.

The present invention makes it possible to provide a focus detection apparatus that limits a wavelength range of light used for the focus detection and uses broader wavelength range except the wavelength of focus detection for microscope observation and other purposes than the focus detection, and a microscope equipped therewith.

BRIEF DESCRIPTION OF THE DRAWINGS

FIGS. 4A and 4B are diagrams showing a configuration of the focus detection apparatus 30 according to the second embodiment of the present invention, in which FIG. 4A shows a configuration of an IR light source 31, and FIG. 4B shows a configuration of a dichroic mirror unit 32.

FIGS. 7A and 7B are diagrams showing a configuration of a partial mirror 41 of the focus detection apparatus 40 according to the third embodiment of the present invention, in which FIG. 7A shows a top view, and FIG. 7B shows a front view.

EMBODIMENTS FOR CARRYING OUT THE INVENTION

A microscope equipped with a focus detection apparatus according to each embodiment of the present invention is explained below with reference to accompanying drawings.

First Embodiment

At first, an overall construction of a microscope equipped with a focus detection apparatus according to the present embodiment.

Figure 1:
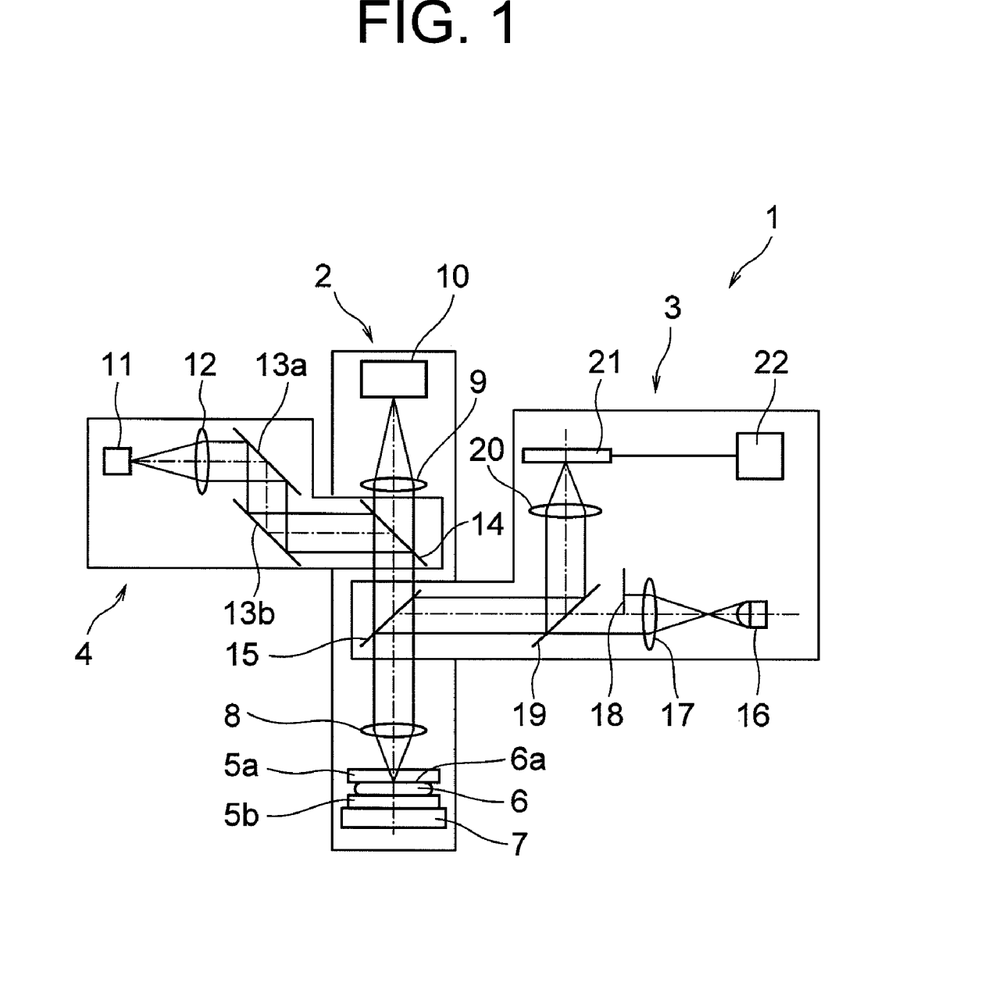
FIG. 1 is a diagram showing a whole construction of a microscope equipped with a focus detection apparatus according to a first embodiment of the present invention.

FIG. 1 is a diagram showing a whole construction of a microscope equipped with a focus detection apparatus according to a first embodiment of the present invention.

As shown in FIG. 1, the microscope 1 is composed of a microscope body 2, a focus detection apparatus 3, and an optical tweezers optical system 4.

In the present embodiment, light except the light using for focus detection is called non-defocus-detection light. In this non-defocus-detection light, there are optical-tweezers light, multi-photon-excitation light, and, for example, fluorescence light from an object to be observed in the fluorescence observation. A light source emanating optical-tweezers light and multi-photon-excitation light is called as a second light source.

The microscope body 2 is equipped with a stage 7 on which a sample 6 put between a cover glass 5a and a slide glass 5b is placed, and in order from the stage 7 side, an objective lens 8, an imaging lens 9, and a camera 10. On the other side of the stage 7 viewed from the objective lens 8 side, there is provided an illumination light source (not shown) that emanates illumination light for illuminating the sample 6 including the wavelength $\lambda_{FL1}, \lambda_{FL2}, \lambda_{FL3}$ which are shorter than a wavelength $\lambda_{IR1}$ of near-infrared light explained later. The objective lens 8 is electrically movable in a direction up and down by an objective lens driver (not shown).

The optical tweezers optical system 4 is equipped with a laser light source 11, and in order from the laser light source 11 side, a lens 12, mirrors 13a, 13b, and a semi-transparent mirror 14. The semi-transparent mirror 14 is disposed on an optical path between the objective lens 8 and the imaging lens 9 in the microscope body 2, so that laser light emanated from the laser light source 11 can be led to the optical path in the microscope body 2 to illuminate the sample 6. In the present embodiment, the laser light source 11 emanates infrared laser light with a wavelength $\lambda_{IR3}$=1064 nm.

With the above-described configuration, in the microscope body 2, light from the sample 6 illuminated by an illumination light source (not shown) passes through the objective lens 8, a dichroic mirror 15 explained later, and the semi-transparent mirror 14 in this order, and forms an image on an imaging surface of the camera 10 by the imaging lens 9. Accordingly, the camera 10 can take an image of the sample 6, and an observer can observe the taken image of the sample 6 through a monitor (not shown) (hereinafter called as "ordinary observation").

In the optical tweezers optical system 4, laser light emanated from the laser light source 11 is reflected by the mirrors 13a, 13b through the lens 12, led to the semi-transparent mirror 14 in the microscope body 2. The laser light is reflected by the semi-transparent mirror 14, and after passing through the dichroic mirror 15 explained later illuminates the sample 6 through the objective lens 8. Accordingly, the observer can carry out the optical tweezers operation to the sample 6 (hereinafter called as "optical tweezers observation").

Then, configuration of the focus detection apparatus 3 that is the most characteristic feature of the present embodiment is explained in detail.

The focus detection apparatus 3 is equipped with an IR light source 16 that emanates light with a given wavelength range and, in order from the IR light source 16 side, a lens 17, a half-mask 18, a semi-transparent mirror 19, and the dichroic mirror 15, and on the reflection optical path of the semi-transparent mirror 19, there are provided with an imaging lens 20, and a photodetector 21. In the present embodiment, the light with the given wavelength emanated from the IR light source 16 is near-infrared light with the wavelength $\lambda_{IR1}$=770 nm.

Figure 2:
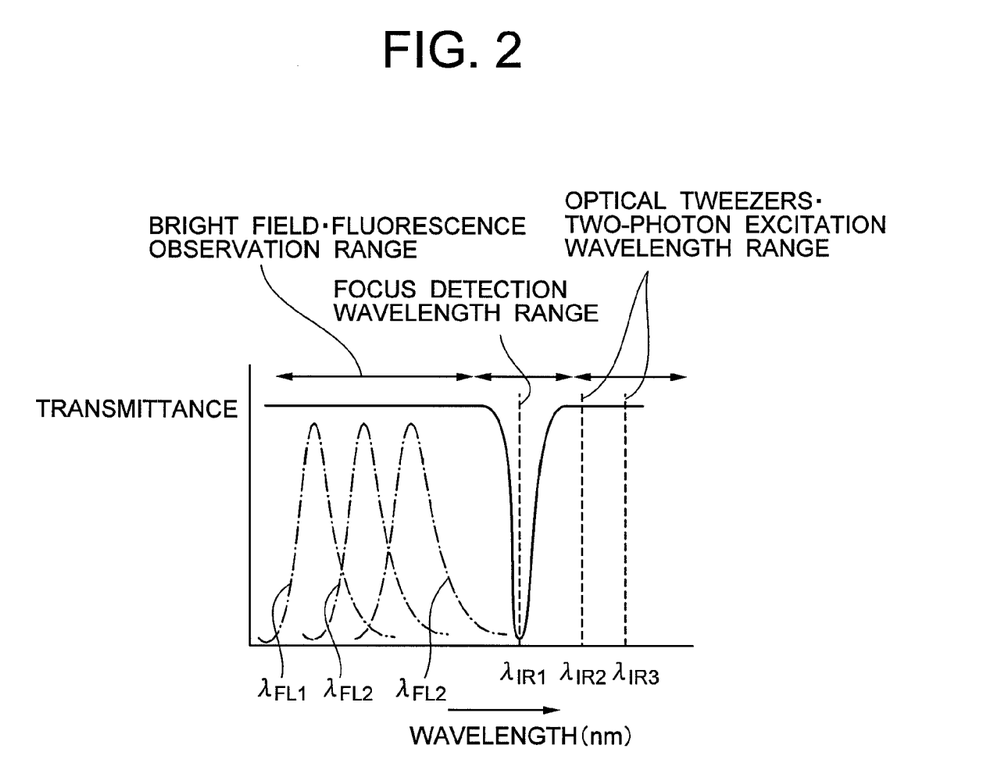
FIG. 2 is a graph showing reflection characteristic of a dichroic mirror 15 of the focus detection apparatus 3 according to the first embodiment of the present invention.

The dichroic mirror 15 is disposed on the optical path between the objective lens 8 and the semi-transparent mirror 14 in the microscope body 2, so that the dichroic mirror 15 can lead the light from the IR light source 16 to the optical path of the microscope body 2. As shown in FIG. 2, the dichroic mirror 15 according to the present embodiment has a characteristic that reflects only certain light emanated from the IR light source 16 with a given wavelength range, in other words, only near-infrared light with the wavelength $\lambda_{IR1}$. FIG. 2 is a graphs showing reflection characteristic of a dichroic mirror 15 of the focus detection apparatus 3 according to the first embodiment of the present invention.

With the above-described configuration, in the focus detection apparatus 3, light emanated from the IR light source 16 with a given wavelength range passes through the lens 17, the half mask 18, and the semi-transparent mirror 19 in this order, and is reflected by the dichroic mirror 15 to the sample 6 side. After passing through the objective lens 8, the light is reflected by a glass interface 6a in the vicinity of the sample 6. The reflected light of the IR light source 16 reflected by the glass interface 6a is reflected again by the dichroic mirror 15 in the IR light source 16 direction, and after reflected by the semi-transparent mirror 19 forms an image on a detecting surface of the photodetector 21 through the imaging lens 20.

As a result, a controller 22 installed in the focus detection apparatus 3 detects the position in the optical axis direction of the glass interface 6a on the basis of the detected signal of the photodetector 21, in other words, defocus between the objective lens 8 and the glass interface 6a is detected, and the objective lens 8 is driven by the objective driver (not shown) installed in the microscope body 2, so that the glass interface 6a is disposed on the focus position of the objective lens 8. Accordingly, focusing on the sample 6 is accomplished in the microscope body 2. Since the above-described focusing operation is always carried out upon observation, the state of focusing on the sample 6 is kept upon observation. Accordingly, the present microscope 1 is extremely useful upon performing an observation together with a dosage or a long time observation, or a continuous observation of a plurality of positions of a sample.

As described above, in the microscope 1, with limiting the light using for the focus detection apparatus 3 (hereinafter called as "focus detection light") to a given wavelength range, light having longer wavelength than the focus detection light can be used for observation. Accordingly, the microscope 1 can perform the optical tweezers observation using the light with longer wavelength than the focus detection light in addition to the ordinal observation using the light with shorter than the focus detection light.

As described above, although the microscope 1 is equipped with the optical tweezers optical system 4, the present invention is not limited to this, and may include an optical system for performing a two-photon excitation observation having a light source emanating infrared light of the wavelength λIR2=850 nm through 1000 nm instead of the optical tweezers optical system 4. In this case, the microscope 1 can perform two-photon excitation observation using the light having longer wavelength than the focus detection light in addition to ordinary observation of the sample 6.

Moreover, focus movement of the present embodiment is carried out by disposing the glass interface 6a to the focus position of the objective lens 8 as described above. However, the configuration of the present embodiment is not limited to this, and the focus detection apparatus preferably includes an offset lens movably in the optical axis direction disposed on the optical path between the semi-transparent mirror 19 and the dichroic mirror 15. By moving the offset lens, the glass interface 6a can be disposed with shifting a given offset amount along the optical axis upon setting the glass interface 6a to the focus position of the objective lens 8. Accordingly, not only the glass interface 6a in other words the surface of the sample 6, but also any position in the depth direction can be focused. Such an offset lens is preferably installed in a focus detection apparatus according to each of the following embodiments.

As described above in the present embodiment, although focusing movement is carried out by moving the objective lens 8 in a direction up and down by the objective lens driver (not shown), the present embodiment is not limited to this, and may provide a stage driver, so that focusing movement is carried out by moving the stage 7 in a direction up and down. This is the same in a microscope according to each of the following embodiments.

Second Embodiment

Figure 3:
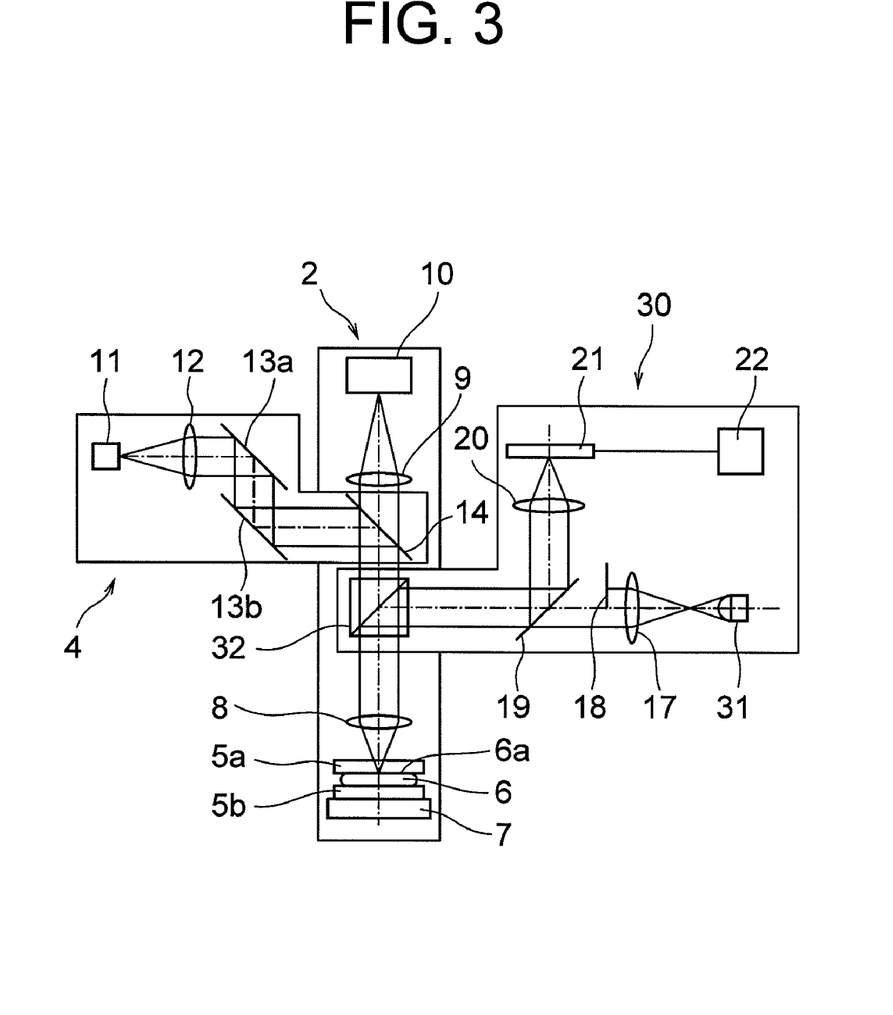
FIG. 3 is a diagram showing a whole construction of a microscope equipped with a focus detection apparatus according to a second embodiment of the present invention.

FIG. 3 is a diagram showing a whole construction of a microscope equipped with a focus detection apparatus according to a second embodiment of the present invention.

A microscope equipped with a focus detection apparatus according to the present embodiment or the third embodiment of the present invention is explained below, in which a construction same as the first embodiment is attached the same symbol with omitting the explanation thereof, and a construction different from the first embodiment is attached different symbol with explaining in detail.

Figure 4A:
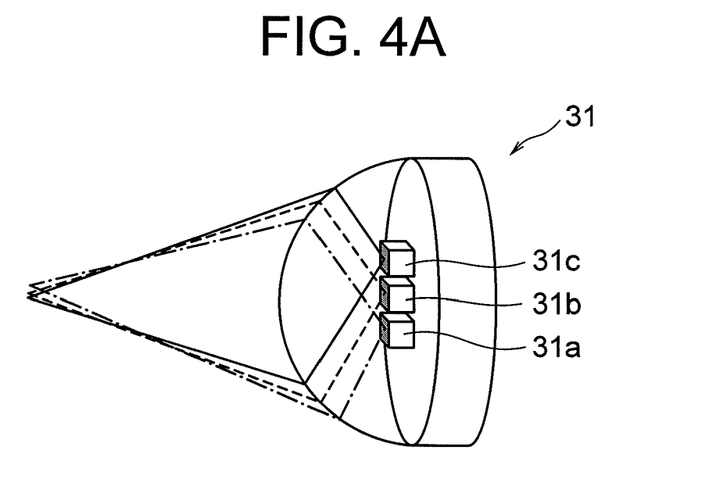
Figure 4B:
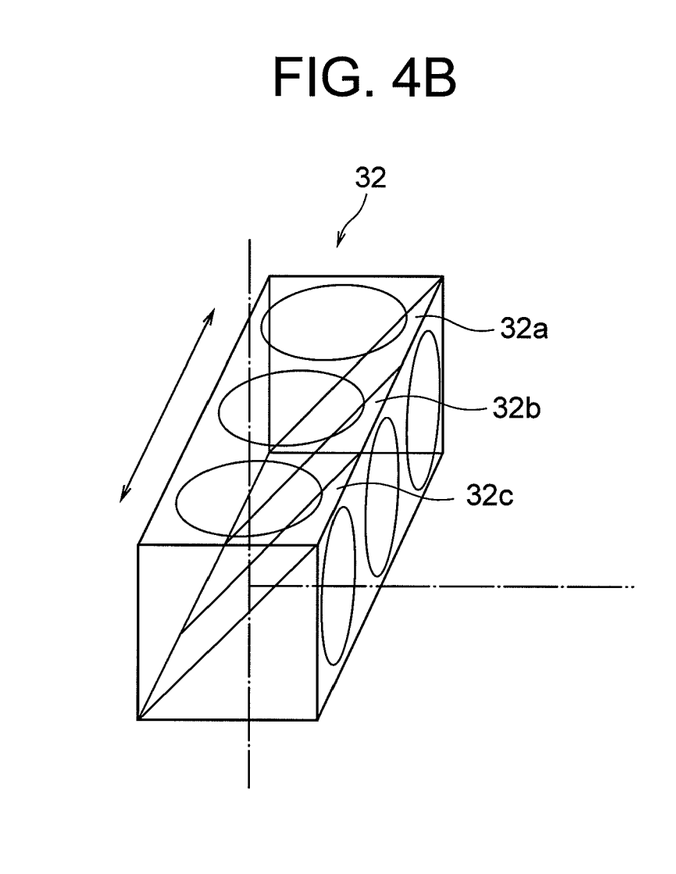

A focus detection apparatus 30 according to the present embodiment is equipped with an IR light source 31 capable of selectively emanating light with a plurality of wavelengths as shown in FIG. 4A instead of the IR light source 16 in the focus detection apparatus according to the first embodiment, and a dichroic mirror unit 32 as shown in FIG. 4B instead of the dichroic mirror 15.

In the present embodiment, the IR light source 31 is equipped with an LED 31a emanating near-infrared light with a wavelength $\lambda_{IR1}$=770 nm, an LED 31b emanating infrared light with a wavelength $\lambda_{IR2}$=870 nm, and an LED 31c emanating infrared light with a wavelength $\lambda_{IR3}$=1064 nm, and an observer can selectively activate these LEDs. FIG. 4A is a diagram showing a configuration of an IR light source 31 of the focus detection apparatus 30 according to the second embodiment of the present invention.

Figure 5:
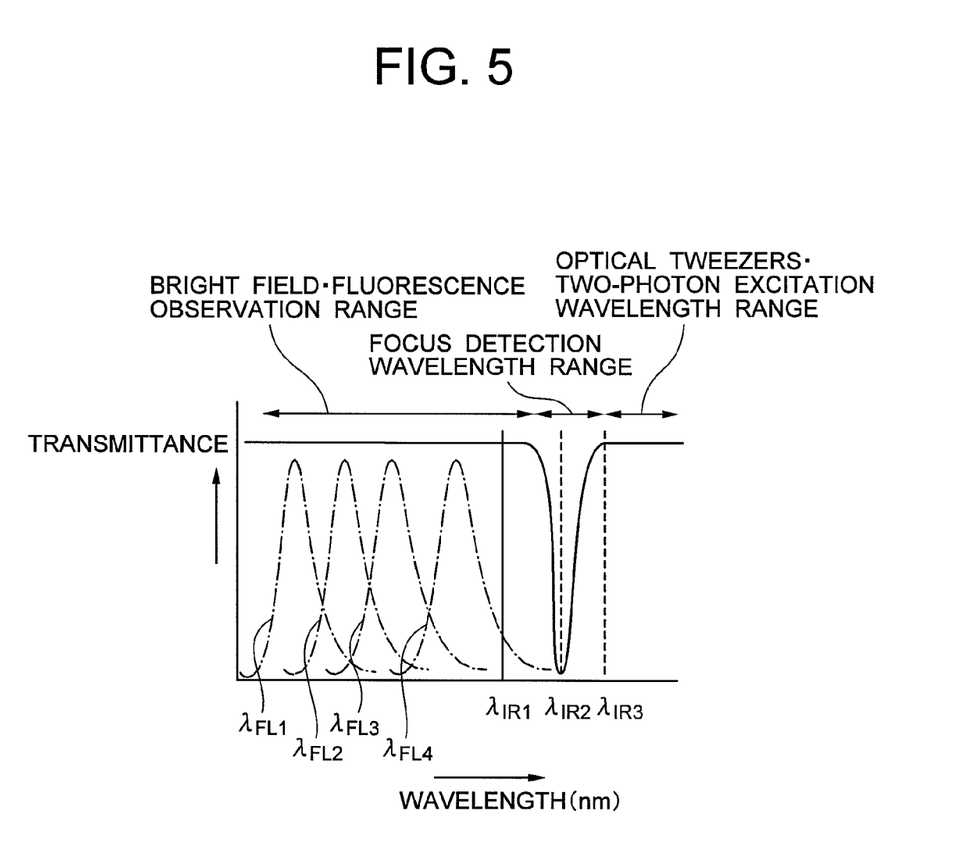
FIG. 5 is a graph showing reflection characteristic of a dichroic mirror 32b of the dichroic mirror unit 32.

The dichroic mirror unit 32 is equipped with a dichroic mirror 32a that reflects only near-infrared light with the wavelength $\lambda_{IR1}$, a dichroic mirror 32b that reflects only infrared light with the wavelength $\lambda_{IR2}$ as shown in FIG. 5, and a dichroic mirror 32c that reflects only infrared light with the wavelength $\lambda_{IR3}$. FIG. 4B is a diagram showing a configuration of a dichroic mirror unit 32 of the focus detection apparatus 30 according to the second embodiment of the present invention. FIG. 5 is a graph showing reflection characteristic of a dichroic mirror 32b of the dichroic mirror unit 32.

The dichroic mirror unit 32 is equipped with a slide mechanism (not shown). Accordingly, by sliding the dichroic mirror unit 32 through the slide mechanism, each of the dichroic mirrors 32a, 32b, and 32c can be selectively disposed in the optical path. As a result, a dichroic mirror corresponding to a wavelength of an LED selected in the IR light source 31 can be disposed in the optical path.

With this configuration, in the focus detection apparatus 30, near-infrared light with the wavelength $\lambda_{IR1}$ emanated from the LED 31a in the IR light source 31 passes through the lens 17, the half mask 18 and the semi-transparent mirror 19, and reflected by the dichroic mirror 32a of the dichroic mirror unit 32 to the sample 6 side. After passing through the objective lens 8, the light is reflected by the glass interface 6a. The reflected near-infrared light with the wavelength $\lambda_{IR1}$ is reflected again by the dichroic mirror 32a of the dichroic mirror unit 32, reflected again by the semi-transparent mirror 19, and forms an image on the detecting surface of the photodetector 21 through the imaging lens 20.

Focusing movement and keeping thereof performed in the controller 22 installed in the focus detection apparatus 30 is the same as the above-described first embodiment.

Although the above-described explanation is made for near-infrared light with the wavelength $\lambda_{IR1}$ emanated from the LED 31a, the similar focusing movement and keeping thereof can be accomplished regarding infrared light with the wavelength $\lambda_{IR2}$ emanated from the LED 31b or infrared light with the wavelength $\lambda_{IR3}$ emanated from the LED 31c by disposing corresponding dichroic mirror 32b or 32c in the dichroic mirror unit 32 into the optical path As described above, the microscope can carry out the similar effect as the first embodiment.

As described above, the microscope can change the wavelength range of the focus detection light corresponding to the observation method to be used together with the ordinary observation by changing LED 31a, 31b, or 31c, and corresponding dichroic mirror 32a, 32b, or 32c in the focus detection apparatus 30. Specifically, for example, the dichroic mirror 32b is disposed on the optical path to make LED 31b radiate, in other words, when infrared light with the wavelength $\lambda_{IR2}$ is used as focus detection light, it becomes possible to carry out a fluorescence observation using a long wavelength fluorescent dye (wavelength $\lambda_{FL4}$) and an optical tweezers observation (wavelength $\lambda_{IR3}$) in addition to an ordinary observation (wavelengths $\lambda_{FL1}$, $\lambda_{FL2}$, $\lambda_{FL3}$) as shown in FIG. 5. Even if the wavelength range of the focus detection light is changed, signal detection condition of the photodetector is made to change electrically, so that focusing state of the sample can be secured.

Third Embodiment

Figure 6:
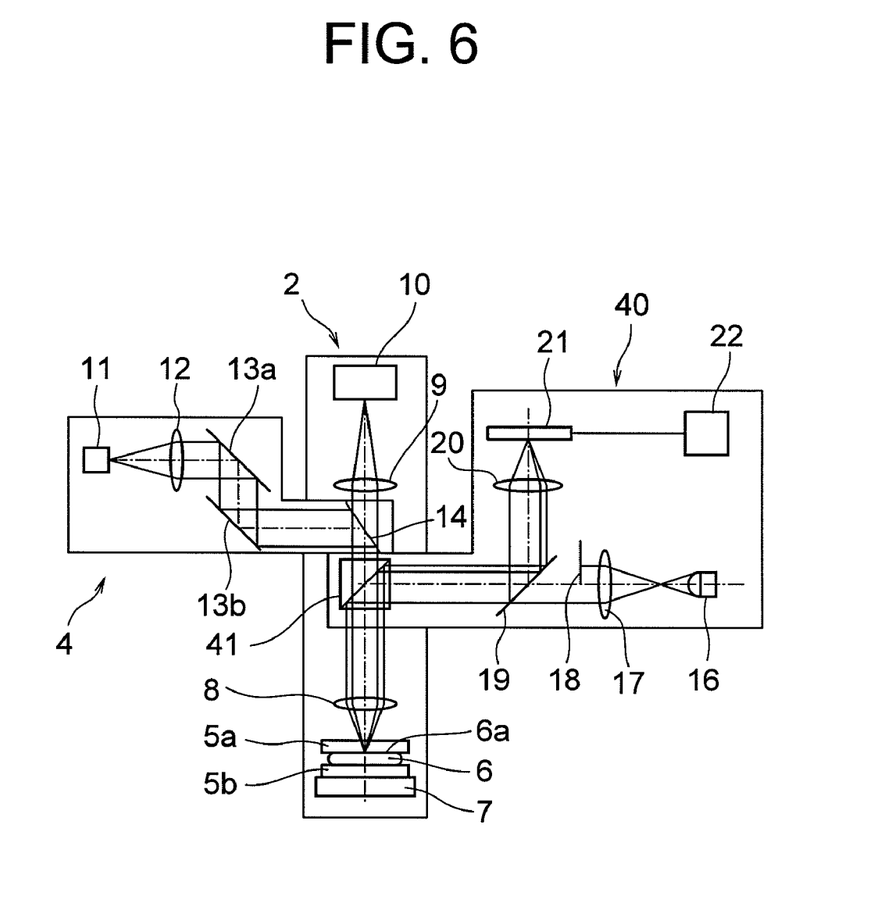
FIG. 6 is a diagram showing a whole construction of a microscope equipped with a focus detection apparatus according to a third embodiment of the present invention.

FIG. 6 is a diagram showing a whole construction of a microscope equipped with a focus detection apparatus according to a third embodiment of the present invention.

Figure 7A:
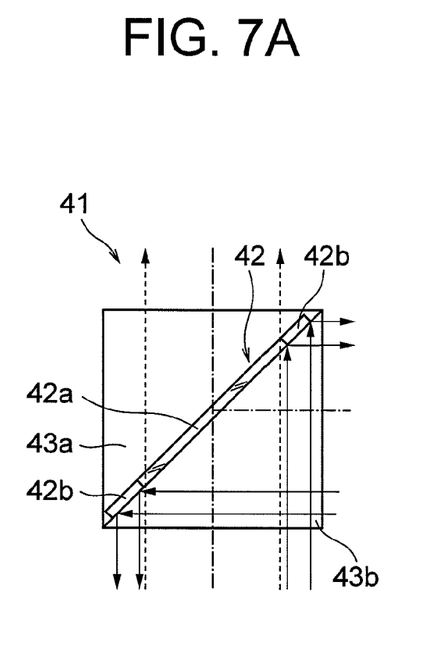
Figure 7B:
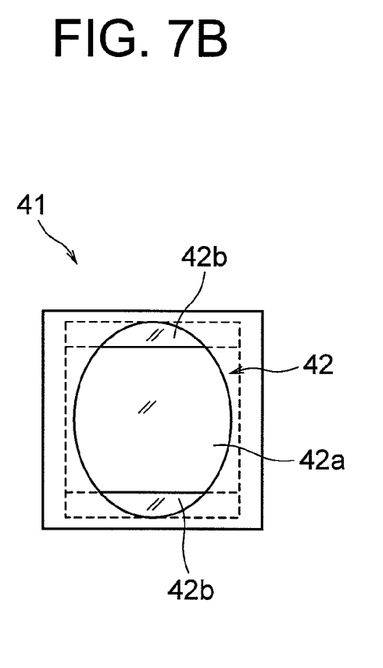

The focus detection apparatus 40 according to the present embodiment is equipped with a partial mirror 41 as shown in FIG. 7 instead of the dichroic mirror 15 in the focus detection apparatus 3 according to the first embodiment.

FIGS. 7A and 7B are diagrams showing a configuration of a partial mirror 41 of the focus detection apparatus 40 according to the third embodiment of the present invention, in which FIG. 7A shows a top view, and FIG. 7B shows a front view.

As shown in FIG. 7B, the partial mirror 41 is composed of a partial mirror body 42, and two triangular prisms 43a and 43b that hold the partial mirror body in between. As shown in FIG. 7B, the partial mirror body 42 is composed of a transparent surface 42a that has an elliptical shape whose major axis extends in an optical axis direction of the objective lens 8 in the microscope body 2 seen from the IR light source 16 side, and a reflecting surface 42b that is provided at each end portion of the major axis of the transparent surface 42a.

With this configuration of the partial mirror 42, most of near-infrared light from the IR light source 16 is transmitted to be disposed outside of the optical path, and only marginal light flux proceeding high NA area is reflected to the glass interface 6a side, and the marginal light flux reflected from the glass interface 6a can be reflected again to the semi-transparent mirror 19 side.

Since the transparent surface 42a of the partial mirror 42 is made sufficiently large so as not to block the light from the sample 6 illuminated by the illumination light source (not shown) in the microscope body 2 and the laser light from the optical tweezers optical system 4, the partial mirror 41 does not cause trouble upon ordinary observation or optical tweezers observation. Even if it blocks light, the amount of blocked light is small, so that it is acceptable.

With this configuration, in the focus detection apparatus 40, the light emanated from the IR light source 16 with a given wavelength range (near-infrared light with a wavelength $\lambda_{IR1}$) passes through the lens 17, the half mask 18, the semi-transparent mirror 19 in this order, and is reflected by the reflecting surface 42b to the sample 6 side. After passing through the objective lens 8, the light is reflected by the glass interface 6a disposed in the vicinity of the sample 6. The reflected light from the glass interface 6a is reflected again by the reflecting surface 42b of the partial mirror 41, reflected again by the semi-transparent mirror 19 to form an image on the detecting surface of the photodetector 21 through the imaging lens 20.

Focusing movement and keeping thereof performed in the controller 22 installed in the focus detection apparatus 40 is the same as the above-described first embodiment.

As described above, the microscope can carry out the same effect as the first embodiment.

The focus detection apparatus 40 according to the present embodiment may be equipped with the IR light source 31 according to the second embodiment instead of the IR light source 16. With this configuration, it becomes possible to carry out the same effect as the second embodiment. Since the partial mirror 41 can be used regardless of the wavelength range of the focus detection light, and the work that the dichroic mirror unit 32 is moved into the optical path in the second embodiment is not necessary, it becomes possible to realize a smooth exchange of the focus detection light.

According to each embodiment, it becomes possible to realize a focus detection apparatus that limits a wavelength range of light used for the focus detection and makes it possible to use light with wavelength range except the wavelength of focus detection for microscope observation such as an ordinary observation and an applied technology accompanied by this, and a microscope equipped therewith.

What is claimed is:

1. A focus detection apparatus comprising:
a light source that emanates light with a $1^{st}$ infrared wavelength range for detecting focus shift between an objective lens and an object to be observed in a microscope; and
an optical member that reflects both of the light with said $1^{st}$ infrared wavelength range irradiated on said object and light irradiated onto said object and reflected thereby, said optical member transmitting multi-photon-excitation light for carrying out fluorescence observation of said object, the multi-photon-excitation light being infrared light with a longer wavelength range than said $1^{st}$ infrared wavelength range, said optical member also transmitting fluorescent light generated at said object excited by the multi-photon-excitation light, the fluorescent light being light with a shorter wavelength range than said $1^{st}$ infrared wavelength range.

2. The focus detection apparatus according to claim 1, wherein the optical member is a partial mirror that reflects marginal light flux of the light with the $1^{st}$ infrared wavelength range to lead to the object to be observed, and transmits the rest of the light flux with the $1^{st}$ infrared wavelength range.

3. The focus detection apparatus according to claim 1, further comprising a photodetector that detects the light reflected by the object.

4. The focus detection apparatus according to claim 3, further comprising a controller that detects focus shift between the objective lens and the object to be observed in the microscope on the basis of a signal from the photodetector.

5. A microscope equipped with the focus detection apparatus according to claim 1.

6. A microscope equipped with said focus detecting apparatus according to claim 1, comprising
an imaging device for imaging said object,
wherein the optical member is disposed on an optical axis of said objective lens and on an optical path connecting said imaging device and said objective lens, on which optical path there is provided a semi-transparent mirror that reflects said multi-photon-excitation light toward said optical member and transmits said fluorescent light generated at said object.

7. A focus detection apparatus comprising:
a light source that emanates light with a $1^{st}$ infrared wavelength range for detecting focus shift between an objective lens and an object to be observed in a microscope; and
an optical member that reflects both of the light with said $1^{st}$ infrared wavelength range to be irradiated on said object and light irradiated onto said object and reflected thereby, said optical member transmitting optical-tweezers light that is light with a longer wavelength range than said $1^{st}$ infrared wavelength range and that is irradiated on said object, said optical member also transmitting fluorescent light from the object to be observed.

8. A microscope equipped with said focus detecting apparatus according to claim 7, comprising
an imaging device for imaging said object,
wherein the optical member is disposed on an optical axis of said objective lens and on an optical path connecting said imaging device and said objective lens, on which optical path there is provided a semi-transparent mirror that reflects said optical tweezers light toward said optical member and transmits fluorescent light generated by said object excited by the optical tweezers light.

9. The microscope according to claim 8, wherein the optical member is disposed between said objective lens and said semi-transparent mirror.

* * * * *